United States Patent [19]

Dumas

[11] 4,053,945
[45] Oct. 11, 1977

[54] MASTER-SLAVE CONTROL METHOD AND DEVICE FOR A MULTIPHASE CIRCUIT

[76] Inventor: Guy H. Dumas, 42 rue du Pere Corentin, 75014 Paris, France

[21] Appl. No.: 646,835

[22] Filed: Jan. 5, 1976

[30] Foreign Application Priority Data

Feb. 18, 1975  France ............................. 75.05054

[51] Int. Cl.² ............................................. H02M 7/155
[52] U.S. Cl. .................................................. 363/129
[58] Field of Search .................... 321/5, 27 MS, 47; 307/252 Q, 262

[56] References Cited

U.S. PATENT DOCUMENTS

| | | | |
|---|---|---|---|
| 3,114,098 | 12/1963 | Rallo et al. ..................... | 321/47 X |
| 3,136,957 | 6/1964 | Putkovich et al. ................. | 321/5 X |
| 3,360,709 | 12/1967 | Etter ........................................ | 321/5 |
| 3,388,310 | 6/1968 | Etter ........................................ | 321/5 |
| 3,434,031 | 3/1969 | Wickliff ................................... | 321/5 |

*Primary Examiner*—William M. Shoop
*Attorney, Agent, or Firm*—Cushman, Darby & Cushman

[57] ABSTRACT

A method and a device for the master-slave control of the power of a multiphase thyristor bridge. A master-pulse, from a master-pulse generating circuit coupled with one phase of the multiphase means, is applied to a slave-pulse generating circuit. Three slave-pulses out of phase of 120° with respect to one another are produced by a slave-pulse generating circuit in case of a three-phase means. Said slave-pulses are applied across the gates and the anodes of a multiphase thyristor bridge.

1 Claim, 5 Drawing Figures

MASTER-SLAVE CONTROL METHOD AND DEVICE FOR A MULTIPHASE CIRCUIT

BACKGROUND OF THE INVENTION

1. Field of the Invention

The invention relates to a master-slave method and device for controlling a thyristor bridge in case of a multiphase current.

2. Description of the Prior Art

As disclosed in particular in the book of H. Lilen "Thyristor et triac" published by the Editions Radio, it is known in the art to use a circuit for controlling the time duration of the conduction of a thyristor during an halfwave of the feed voltage in order to control the power passing through a load. Such a circuit has been developed by the Applicant under the name of "Circuit L1" and exhibits in particular the advantage to permit a linear control of the feed power through a load.

In the prior art, an application of such circuits in a multiphase network and in particular in a three-phase network is disclosed in chapter 13 of the above cited book of H. Lilen, in particular in FIGS. 13–24 of this book which is shown in attachment (FIG. 1). Referring to FIG. 1, three circuits "L1" are used for controlling the three thyristors present on the phases U, V and W. Said three circuits "L1" are respectively connected for being fed and timed to the phases VU, UW, WV, said connections being made through three coupling transformers (not shown in FIG. 1). Said thyristor control circuit of the prior art presents several drawbacks. The first drawback stands in the necessity to provide for three circuits "L1" or analogous or three coupling transformers to permit the control of the power in the three-phase circuit, which increases the costs, the complexity and the bulk of the control device. The second drawback stands in the necessity to suitably connect each circuit "L1" to different determined phases of the three-phase feed circuit, whereby the error risk is not negligible. A third drawback stands in the fact that the circuits "L1" are circuits which have to be adjusted while inserted in a network; accordingly, three independent adjustments are necessary for balancing the circuit.

SUMMARY OF THE INVENTION

It is an object of the present invention to provide a new control device for a multiphase thyristor bridge avoiding the above cited drawbacks, that is necessitating a smaller number of circuits "L1" or analogous and coupling transformers, easier to connect and to adjust.

To reach this object and others, the instant invention provides for a master-slave control method for controlling a multiphase thyristor bridge, comprising the following steps:

forming a master-pulse, having a determined and adjustable phase relation with respect to one phase of the polyphase feed voltage, delaying by parallel or serial-parallel devices said master-pulse in order to provide a number of slave-pulses equal to the number of phases of the multiphase feed voltage, applying said respective slave-pulses to the gates of the thyristors comprised in the bridge.

Brief Description of the Drawings

This method together with means for implementing same will be explained in greater detail in the following description of preferred embodiments of the instant invention, in connection with the attached drawings where.

Description of the Preferred Embodiment

The description of a preferred embodiment will be made in connection with a three-phase circuit. However, it will be easy for those skilled in the art to adapt such a three-phase circuit to any multiphase circuit.

Figure 1:
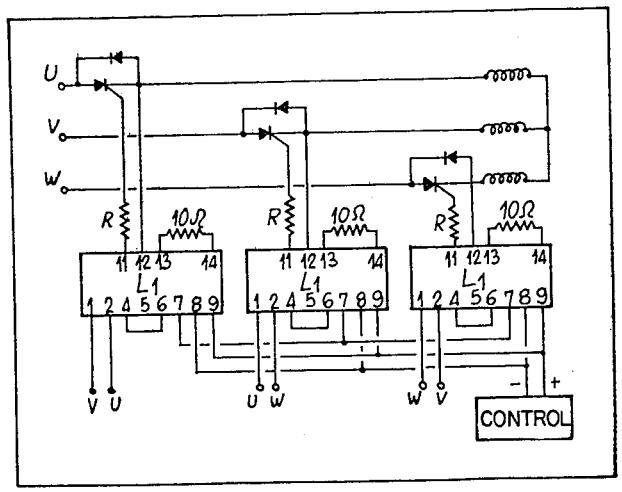
FIG. 1 shows a control diagram for a three-phase thyristor bridge of the prior art.

FIG. 1 shows a prior art control circuit for controlling the three-phase power by using three thyristors, each of which is controlled by a circuit "L1". The drawback of such a control circuit has been indicated hereinabove and this figure will not be disclosed here in greater details.

Figure 2:
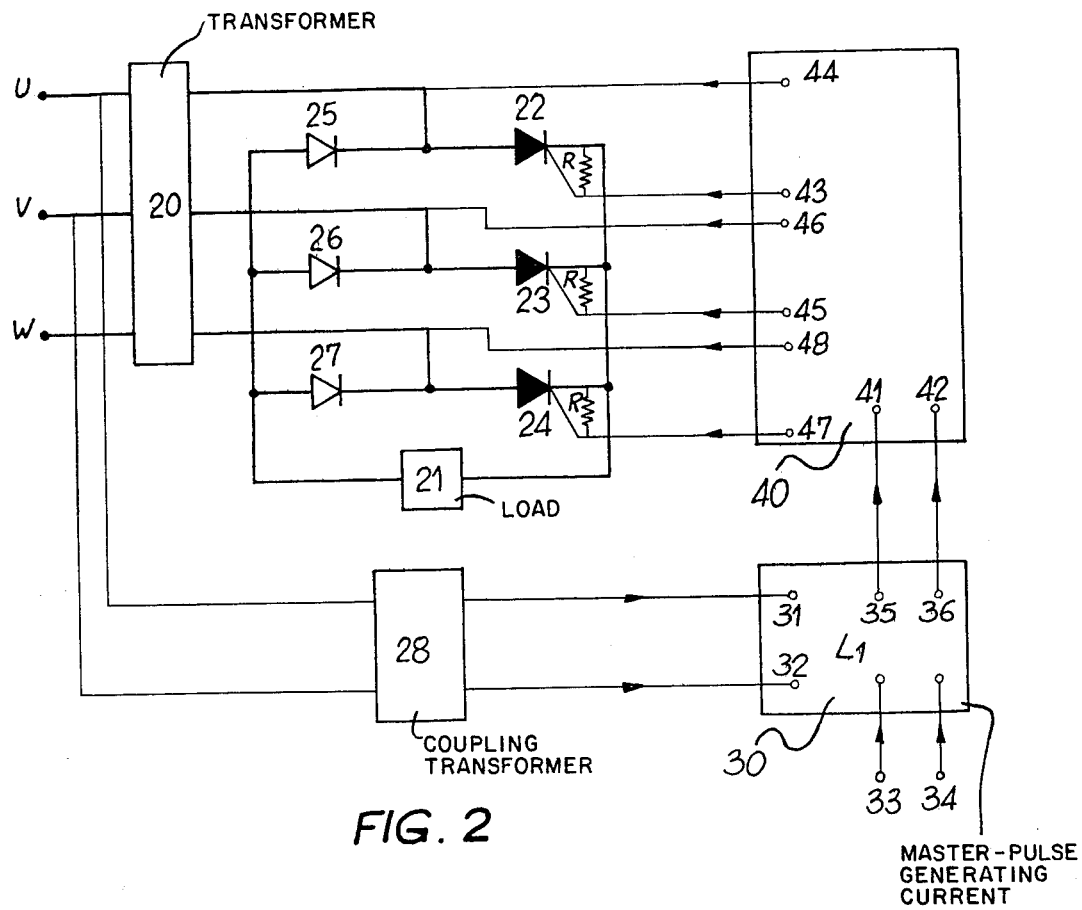
FIG. 2 is a block diagram showing a master-slave control device according to the instant invention.

FIG. 2 shows a block diagram of a master-slave control circuit for controlling a three-phase thyristor circuit. In this circuit, the three phases U, V, W of a three-phase network are applied through a transformer 20 to a load 21, the control being made by a bridge comprising three thyristors 22, 23 and 24 and three diodes 25, 26 and 27. Such a bridge circuit for feeding the load 21 does not constitute a part of the instant invention and can be modified in different ways as it is well known by those skilled in the art. In particular, a bridge using pairs of thyristors can be used. According to the instant invention, the voltage between two phases of the mains is applied through a coupling transformer 28 to a circuit "L1" or analogous across feeding terminals 31 and 32. The circuit 30 receives also a control signal across terminals 33 and 34 for controlling the phase shift between the output pulse provided at terminals 35 and 36 and the input voltage from the terminals 31 and 32. The master-pulse from the circuit 30 is derived to a circuit generating slave-pulses 40 across terminals 41 and 42 of said circuit and the circuit 40 generates slave-pulses having a 120° phase shifting to one another between the gates and the anodes of the thyristors 22, 23 and 24 respectively, through the output terminals 43 and 44, 45 and 46, 47 and 48.

Figure 3:
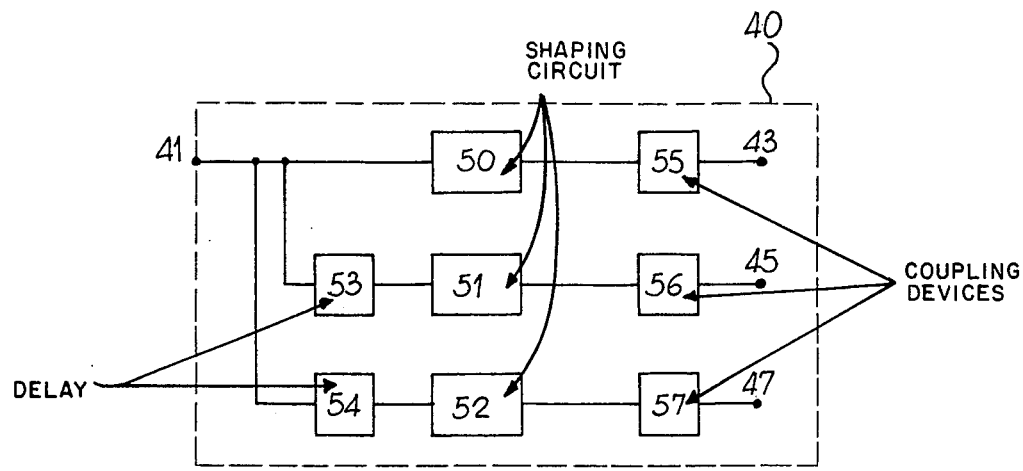
FIG. 3 is a block diagram showing the circuits for deriving from the pulse of the circuit "L1" three pulses out of phase with one another to the gates of three thyristors arranged in the three-phase load circuit.

FIG. 3 is a schematic block diagram of the slave-pulse generating circuit 40, the two-wire connections being shown by single lines. The pulse from the circuit 30 incoming at the terminal 41 is directly transmitted to a shaping circuit 50 and to shaping circuits 51 and 52 through respective delay circuits 53 and 54. The delay circuits 53 and 54 provide phase shifts of 120° and 240° respectively. Then, the pulses are transmitted to the output terminals 43, 45 and 47 through coupling means 55, 56 and 57. It will be appreciated that various modifications of the circuit of FIG. 3 are comprised in the scope of the instant invention. In particular, the delay circuit 54, instead of being a 240° delay means connected with the input terminal 41, can be a 120° delay means connected with the output terminal of the delay means 53.

Figure 4:
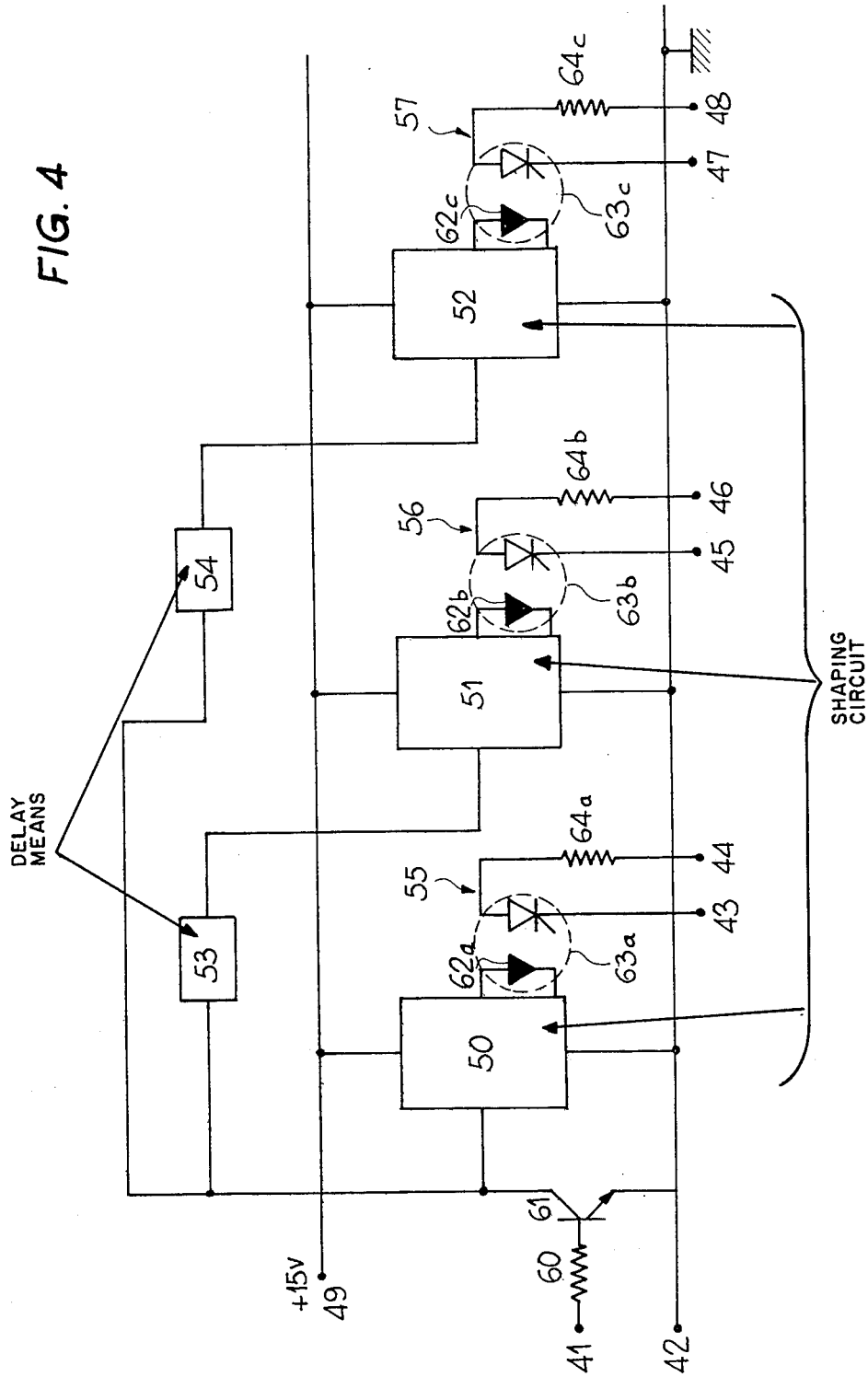
FIG. 4 shows with greater details the circuit of FIG. 3.

FIG. 4 shows in greater details an embodiment of the circuit very schematically shown in FIG. 3. It will be appreciated that in FIGS. 2, 3 and 4 the same references apply to identical elements. The circuit of FIG. 4 comprises in addition to the input terminals 41 and 42 and the output terminals 43 to 48, a terminal 49 to which is connected a +15 volts D.C. voltage for biasing the various transistors used in this circuit. It will be appreciated that the terminal 49 will be preferably connected to a D.C. voltage feeding terminal from the circuit "L1" 30, shown in FIG. 2. The master-pulse from the circuit 30 is applied across the input terminal 41 and the ground terminal 42. Said master-pulse is sent through a buffer circuit and an emitter follower transistor 61, on the one hand to a shaping circuit 50 and, on the other hand, to the delay circuits 53 and 54 which can for example be the circuits known as H117 from the Italian company SGS. The circuit 50 generates, further to the reception of a pulse, a current towards a light emitting diode 62a which is coupled with one or more photodiodes 63a. The photodiodes 63a can also be photothyristors. The photodiode 63a is serially connected with a resistor 64a across the terminals 43 and 44 for providing a control current across the gate and the anode of the thyristor 22 shown in FIG. 2. Analogous circuits provided with a sub-index b are provided at the output of the shaping circuit 51 and other analogous circuits provided with a sub-index c are provided with at the output of the shaping circuit 52.

Figure 5:
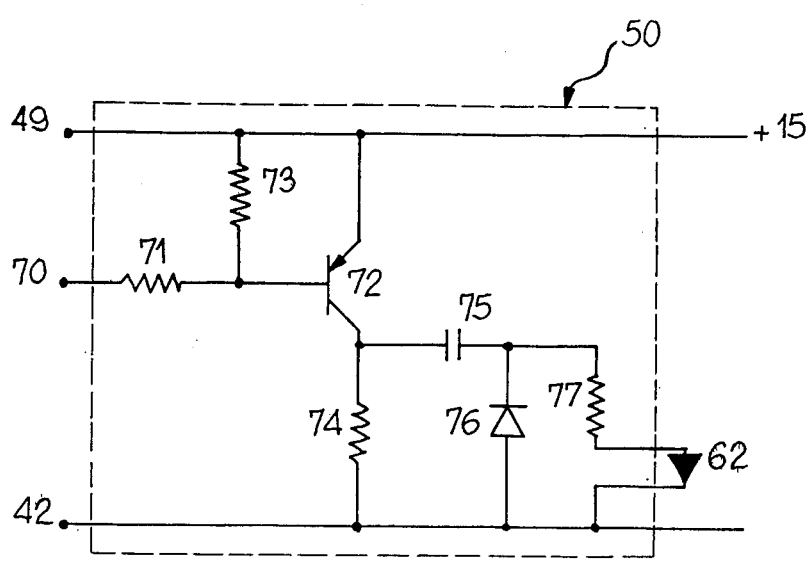
FIG. 5 shows a shaping circuit of FIG. 4.

FIG. 5 shows an embodiment of the shaping circuit 50, 51 and 52. This circuit comprises an input terminal 70 for receiving the master-pulse from the circuit 30 through the intermediate means above disclosed. Said master-pulse is transmitted to the base of a transistor 72. The base of the transistor 72 is also connected with the feeding voltage at +15 volts through a resistor 73. The emitter of said transistor is connected with said voltage source of +15 volts and the collector is connected with the ground through a resistor 74. The collector of the transistor 72 is also connected with a capacitor 75, the other end of which is connected with the ground, through, on the one hand a diode 76 and, on the other hand the serial connection of a resistor 77 and the above-mentioned light emitting diode 62. It is apparent for those skilled in the art that the circuit shown in FIG. 5 is only a specific embodiment of an adapter and shaper circuit and such a circuit can be implemented according to various embodiments.

If the bridge for applying the multiphase current to a load is not a combined bridge comprising thyristors and diodes but a bridge comprising pairs of thyristors, pairs of photothyristors 63 or analogous will be associated with the electroluminescent diodes 62 in order to send at the same time pulses to said pair of photothyristors (or photodiodes).

Accordingly, all the above mentioned advantages of the present invention are achieved. On the one hand, only one "L1" type circuit and only one coupling transformer are used. On the other hand, the simplest connections of this circuit with the three-phase network reduce the error and shorting risks. Finally, the adjustment of the delay means is very safe and the simultaneous adjustement of three control devices is avoided.

Obviously, many modifications and variations of the present invention may be made as regards the foregoing detailed description without departing from the spirit and scope of the invention.

What is claimed is:

1. A master-slave device for controlling the power of a multiphase thyristor bridge comprising:
    a single means for forming a master-pulse having a determined and adjustable phase relationship with one phase of the multiphase feed voltage;
    delay means in parallel or serial-parallel in order to provide a number of slave-pulses equal to the number of phases of the multiphase feed voltage;
    coupling means comprising photocouplers for applying said slave-pulses to the respective gates of the thyristors of the bridge whereby the control circuit is insulated from the charge circuit.

* * * * *